United States Patent [19]

Kneer

[11] 4,184,269
[45] Jan. 22, 1980

[54] APPARATUS FOR AERATING ORGANIC WASTE MATERIAL

[75] Inventor: Franz X. Kneer, Eschenburg-Eibelshausen, Fed. Rep. of Germany

[73] Assignee: Gebrüder Weiss KG, Dillenburg, Fed. Rep. of Germany

[21] Appl. No.: 969,686

[22] Filed: Dec. 14, 1978

[30] Foreign Application Priority Data

Dec. 21, 1977 [DE] Fed. Rep. of Germany ....... 2757144

[51] Int. Cl.² ............................................ F26B 17/12
[52] U.S. Cl. .......................................... 34/168; 71/9; 71/64 JC; 422/116; 422/232
[58] Field of Search ........................ 71/8, 9, 14, 64 JC; 422/116, 225, 232; 110/242, 255; 34/168, 169, 173, 218

[56] References Cited

U.S. PATENT DOCUMENTS

| 2,474,833 | 7/1949 | Eweson | 34/168 X |
| 3,270,437 | 9/1966 | Lara et al. | 34/168 |
| 3,756,784 | 9/1973 | Pittwood | 71/64 JC |
| 4,062,770 | 12/1977 | Kneer | 71/9 X |

FOREIGN PATENT DOCUMENTS 2705720 2/1977 Fed. Rep. of Germany ............... 71/9

*Primary Examiner*—Edward G. Favors
*Attorney, Agent, or Firm*—Toren, McGeady and Stanger

[57] ABSTRACT

In a stationary upright cylindrically shaped container, organic waste materials are passed downwardly from an upper inlet opening to a lower outlet opening. At the same time air is passed in counterflow upwardly through the downwardly flowing body of waste materials being converted into compost. The air supply means at the lower end of the container are divided into sector-shaped parts, and the compost is conveyed to the outlet opening from each of the sectors of the body so that the moisture content of the material leaving each sector can be checked. Air is introduced, in turn, into the lower end of each sector within the container. The amount of air introduced into each sector is regulated in accordance with the moisture content of the material discharged from that sector.

8 Claims, 3 Drawing Figures

APPARATUS FOR AERATING ORGANIC WASTE MATERIAL

SUMMARY OF THE INVENTION

The present invention is directed to the aeration of organic waste materials for transforming them into compost. The materials are guided from the inlet in the form of a material column, downwardly through an upright stationary container which has a cylindrical cross-section, to an outlet in the bottom of the container. The treated waste materials are discharged through the centrally located outlet by a rotating discharge screw conveyor which moves the materials radially inwardly to the outlet. Air inlet openings are provided in the bottom of the container for admitting air for counterflow upwardly through the material column with the amount of air supplied being determined by a control device.

In an apparatus for aerating organic waste materials, such as the one disclosed in German Offenlegungsschrift No. 2,541,070, it is known that in spite of a uniform air supply over the entire cross-section of the waste material in the container, the discharged treated material has, at times, a variable moisture content. Increasing the rate of air flow when the moisture content is found to exceed a certain level, until the desired moisture content is achieved, has the result, as experience has shown, that dry zones occur within the body of the material being treated and such zones are highly undesirable, since the digestion process stops in such zones.

Therefore, the primary object of the present invention is to provide a new apparatus for aerating waste materials in digestion containers with the waste materials travelling downwardly through the container in the form of a body of material. The apparatus facilitates a simple and reliable supply of air into specific portions of the body of material, regulated with regard to the amount and the time per unit area involved. In other words, a variably controlled aeration is provided relative to the cross-section of the body of material moving downwardly through the digestion container.

In accordance with the apparatus of the present invention, air inlet openings are arranged in groups relative to sector-shaped portions of the body of material. Each group of air inlet openings is arranged in an inlet duct and each duct is connected through a time switch to a common supply source. The period during which each sector is aerated is controlled depending on the moisture content of the digested material discharged from that sector.

In a preferred embodiment of the present invention, the air inlet openings are distributed in four radially extending ducts spaced 90° apart. The four inlet ducts are connected to a common feed ring which extends around the centrally located outlet from the container. The feed ring is connected to a supply pipe via an adjusting valve.

Another feature of the present invention is the provision of an adjusting valve for each of the inlet ducts with each valve actuated by an electromotor. Each adjusting valve is connected to an associated time switch. The time switches are adjusted manually or through a control device connected to a moisture sensor which checks the moisture content of the digested material as it is discharged through the outlet opening.

Although the air is introduced into individual sectors within the container, after the air passes through a certain material layer, it then flows throughout the entire body of the waste materials above the inlet sector. Accordingly, sector zones containing excessive moisture can be eliminated in a simple manner by varying the flow of air into a specific sector. In this way, particular sectors at the bottom of the body of waste materials can be more strongly aerated than the other sector zones. As a result, a so-called forced aeration can be achieved whereby the material being digested can be variably aerated based on the moisture conent of the material discharged from that sector. Thus, the desired aerating influence occurs only within the lower end of a particular sector Since the periods during which the adjusting valves are opened are arranged to overlap, a continuous flow of air through the body of waste materials is ensured. Another advantage of this aeration apparatus is that the maximum available aeration output can be used, for a short time, to aerate only one sector for eliminating excessively compacted wet zones of the waste materials which occur for a short time.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
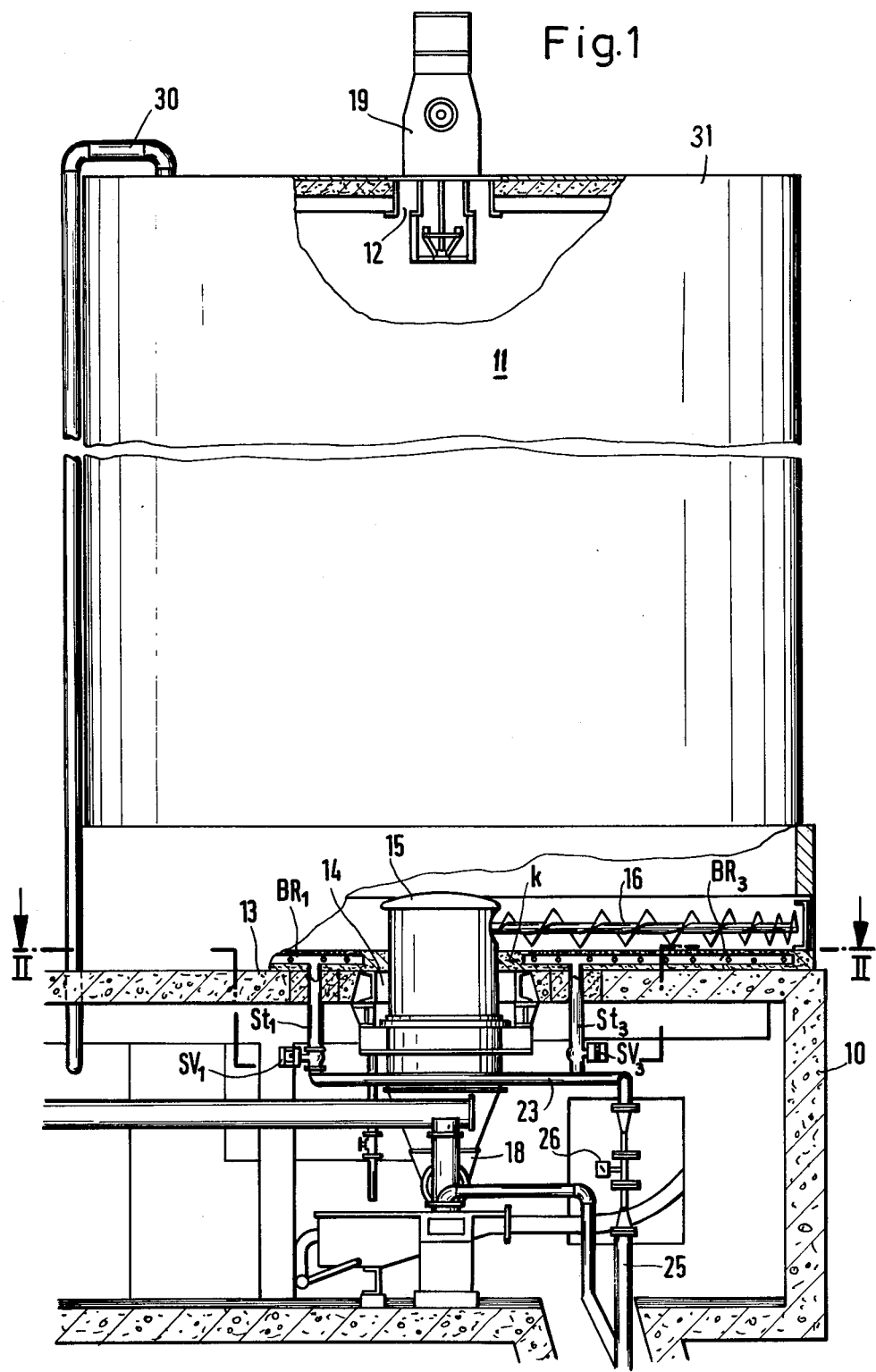
FIG. 1 is a vertical side view, partly in section, of an upright container for the digestion treatment of organic waste materials incorporating apparatus embodying the present invention.

In FIG. 1 in-ground foundation 10 supports a vertically extending container 11 which is cylindrical in cross-section. The walls of the container 11 are heat insulated. At its top, container 11 has a centrally arranged inlet opening 12 and at its bottom, it has a centrally arranged outlet opening 14. Rotary cylinder 15 is centrally located in the bottom of the container and extends through the opening 14. A discharge screw container 16 extends radially outwardly from the cylinder 15 across the lower end of the container. Cylinder 15 is driven by a motor, not shown, and rotates via a gearing, also, not shown. The discharge screw conveyor is located closely above the bottom of the container 13 and rotates with the cylinder 15 and is driven via a motor and gearing, not shown.

Figure 3:
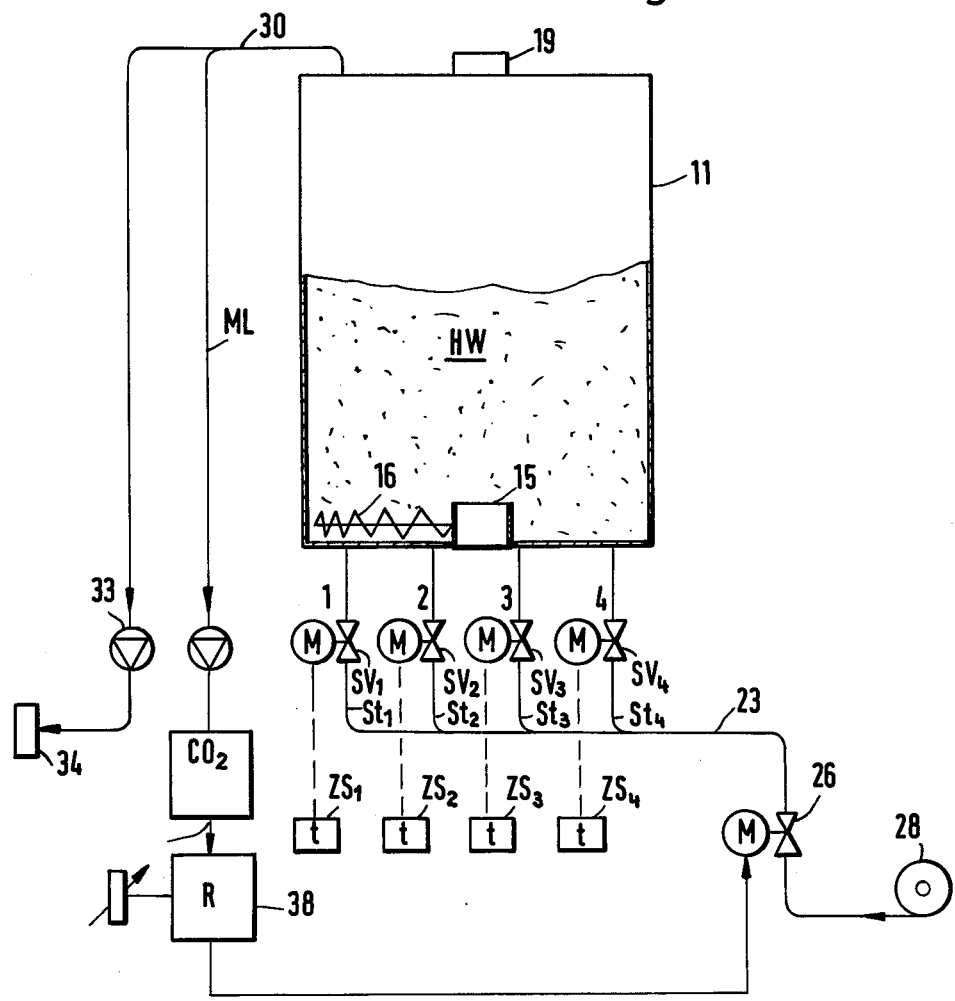
FIG. 3 is a schematic operating diagram of the apparatus illustrated in FIGS. 1 and 2.

When the container 11 is filled, a column or body of waste materials HW extends upwardly above the discharge screw conveyor 16, note FIG. 3. In its uppermost layer, the column of waste materials may consist of undigested garbage, sludge or similar organic wastes and, its lowermost layer consists of digested material. The digested material is removed by moving the discharge screw conveyor about the axis of the container and by revolving the screw conveyor for carrying the material inwardly to the outlet opening 14 from where it flows downwardly into outlet connection 18. A charging device 19 is provided at the top of the container for discharging waste materials to be digested, into the inlet opening 12. As a result, the column of waste materials travels slowly downwardly through the container from its top to its bottom.

Figure 2:
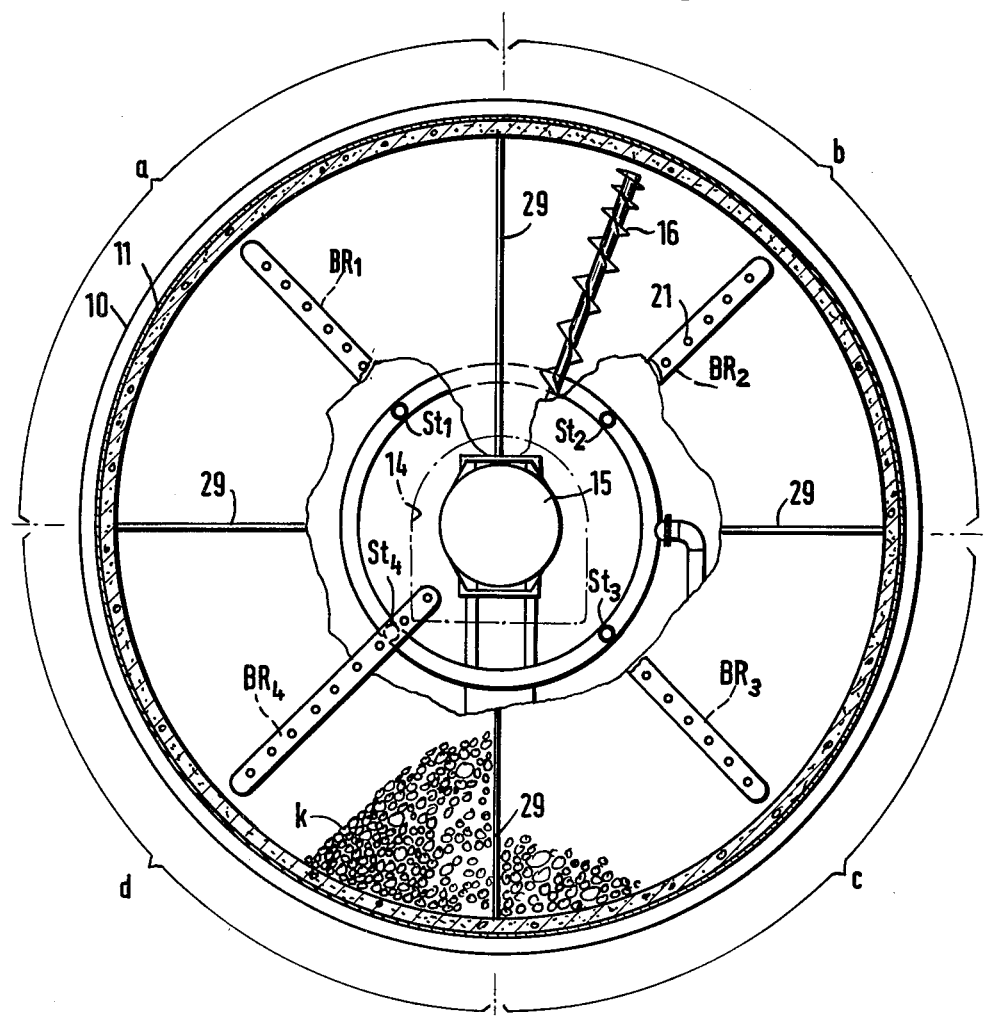
FIG. 2 is a sectional view taken along the line II—II in FIG. 1.

As shown in FIGS. 1 and 2, four air inlet ducts $BR_1$–$BR_4$ are located in the bottom of the container below the discharge screw conveyor 16. The air inlet ducts are spaced 90° apart and extend radially relative to the central axis of the container. Each air inlet duct $BR_1$–$BR_4$ has a number of air inlet openings 21 spaced apart in the radial direction of the container 11. A standpipe $St_1$–$St_4$ is connected to each of the air inlet ducts and the lower ends of the standpipes are connected to a feed ring 23 extending around the rotary cylinder 15. Each standpipe has an adjusting valve $SV_1$–$SV_4$ and each valve is actuated by an electromotor. Feed ring 23 is supplied with compressed air from a pressure blower 28 via a supply pipe 25 in which an adjusting valve 26 is provided operated by a motor.

The lower end of the container 11 is divided by four angularly spaced radially extending partitions 29. Partitions 29 extend above the air inlet ducts and their upper ends are located below the discharge screw conveyor 16. Partitions 29 divide the bottom of the column of waste materials HW into individual sectors a–d with each sector being filled with gravel K. Each sector is supplied with fresh air by one of the air inlet ducts. As indicated, the top ends of the partitions 29 terminate below the discharge screw conveyor so that it can rotate with the cylinder 15 around the bottom of the container above the divided sectors a–d.

A suction line 30 is connected through the container cover 31 and extends downwardly to a suction blower 33 for removing the air-gas mixture emerging from the upper surface of the waste materials column in the container. The air-gas mixture is drawn off through the suction line and discharged into the atmosphere through filter 34 which is schematically illustrated in FIG. 3. Furthermore, a separate line ML is connected to the outlet suction line 30 for checking the $CO_2$ content in the exhaust gas removed from the container.

The operation of the described apparatus will now be explained with the aid of FIG. 3.

Fresh air drawn in by the pressure blower 28 is conveyed into the container 11 through adjusting valve 26, the feed ring 23, the standpipes $St_1$–$St_4$, and the air inlet ducts $BR_1$–$BR_4$. Within the container 11, the fresh air flows upwardly through the body of waste materials HW. A partial vacuum is established above the body of material by the suction pump 33, and the air-gas mixture flowing out of the top of the body of waste materials is drawn off through suction line 30 and conveyed into the atmosphere. In dependence on, for example, the $CO_2$ content in the exhaust air-gas mixture and a given nominal value, the air flow through the body of waste materials is controlled in a predetermined manner by a control unit 38 which regulates the motor controlling the adjusting valve 26.

The aeration of the body of waste materials is carried out successfully in sectors by means of the adjusting valves $SV_1$–$SV_4$, each connected to an associated $St_1$–$St_4$ standpipe. Each of the adjusting valves $SV_1$–$SV_4$ is opened and closed for a predetermined period via a time switch $ZS_1$–$ZS_4$. During operation, the switching on and off of the adjusting valves $SV_1$–$SV_4$ is carried out in sequence, that is, sector a, sector b, sector c, sector d, sector a and so on with each sector receiving air for the same time interval determined on the basis of empirical findings. Accordingly, by means of the control unit 38, the amount of air conveyed into the body of waste materials is determined on the basis of a predetermined nominal value and a measured actual value. After flowing into the gravel layer K, the air originally supplied into one of the sectors a–d, is distributed above the sector, that is above the partition walls 29, throughout the entire cross-section of the body of waste materials which slowly travels downwardly through the container. The air passes in counterflow upwardly through the body of waste materials and is drawn off from the top of the container in the manner mentioned above.

A change in the adjustment of the time switches $ZS_1$–$ZS_4$, that is, a change in the predetermined aeration time of the individual sectors, is, in the simplest case, carried out manually on the basis of the moisture content of the digested material discharged by the screw conveyor from a particular sector of the container for a given time. By mechanical indicating means, not shown, it can be determined over which of the sectors a–d the screw conveyor passes at a given time. For example, in FIG. 2 the screw conveyor 16 is located in or over the angular range of the sector b. Accordingly, to influence the moisture content of the material in that sector, if the moisture content varies from the predetermined content, the adjustment of the time switch $ZS_2$ is changed. The time switch is returned to its original adjustment as soon as the moisture content in the sector returns to the predetermined value. Additionally, the adjustment of the time switches can be effected by a control unit based on the readings provided by a moisture sensor located in the outlet pipe from the outlet 14 in the bottom of the container.

While specific embodiments of the invention have been shown and described in detail to illustrate the application of the inventive principles, it will be understood that the invention may be embodied otherwise without departing from such principles.

What is claimed is:

1. Apparatus for aerating organic waste materials to transform the waste materials into compost, comprising a stationary container having an upper end, a lower end and a cylindrically shaped side wall extending between said upper and lower ends, said upper end having an inlet opening for the waste materials, said lower end having an outlet opening for the compost so that the waste materials flow downwardly through said cylindrically shaped container, means located in the lower end of said container for moving the compost in the lower end to said outlet opening, means for supplying air into the material column at the lower end of said container for flow upwardly through the material column, means for controlling the flow of air into the material column, wherein the improvement comprises that said means for supplying air comprises a plurality of air inlet ducts located in the lower end of said container and said ducts being spaced apart and each having a plurality of spaced openings so that each said duct supplies air into a sector shaped part of the transverse cross-section of said material column, a common air supply pipe for said air inlet ducts, said means for controlling the flow of air comprises a time switch connected to each said air inlet duct and arranged to connect each said air inlet duct, in turn, to said air supply pipe for flowing air for a given period of time into the sector associated with said air inlet duct in accordance with the moisture content of the aerated compost removed from the same said sector by said means for moving the compost material.

2. Apparatus, as set forth in claim 1, wherein said air inlet ducts extend radially outwardly from adjacent the upwardly extending axis of said container to adjacent the cylindrically shaped side wall thereof with the openings in said ducts being spaced apart in the radial direction of said side wall, said ducts are angularly spaced apart in a symmetrical arrangement, a distributing ring extending around said compost outlet opening below said container and interconnecting said air inlet ducts to said air supply pipe, and an adjusting valve in said air supply pipe for controlling the flow of air therethrough.

3. Apparatus, as set forth in claim 2, wherein said air inlet ducts extend generally horizontally above and immediately adjacent the bottom of said container with said ducts being spaced 90° apart.

4. Apparatus, as set forth in claim 2, wherein each said air inlet duct includes a connecting standpipe joining said air inlet duct to said feed ring, an adjusting valve in each standpipe, an electromotor actuating each said adjusting valve, a line connecting each said adjusting valve to a corresponding said time switch so that said time switch opens said adjusting valve for a given period of time and then closes said adjusting valve.

5. Apparatus, as set forth in claim 4, wherein said time switches are manually adjustable based on the moisture content of the aerated compost removed from the sector to which said time switch corresponds.

6. Apparatus, as set forth in claim 4, comprising a moisture sensor located in said outlet opening, a control unit connected to said moisture sensor and to said time switches for adjusting each said time switch in accordance with the moisture content in the aerated compost removed from the sector corresponding to said time switch.

7. Apparatus, as set forth in claim 2, wherein said outlet opening is located concentrically to the upwardly extending axis of said container, said means for moving the aerated compost comprising a discharge screw conveyor movable about the axis of said container in a generally horizontal plane adjacent the lower end of said container for conveying aerated compost radially inwardly to said outlet opening, said air inlet ducts being located below said screw conveyor, radially extending partition walls located in the bottom of said container and creating a plurality of air supply sectors corresponding to the number of said air inlet ducts, said partition walls extending upwardly from the bottom of said container to above said air inlet ducts, a gravel placed in each said sector, and the tops of said separating walls being located below the horizontal plane of movement of said screw conveyor.

8. Apparatus, as set forth in claim 4, wherein said time switches are arranged to actuate said adjusting valves so that the time periods during which said valves successively operate overlap for providing a continuous air flow into the material column within said container.

* * * * *